United States Patent Office 2,756,258
Patented July 24, 1956

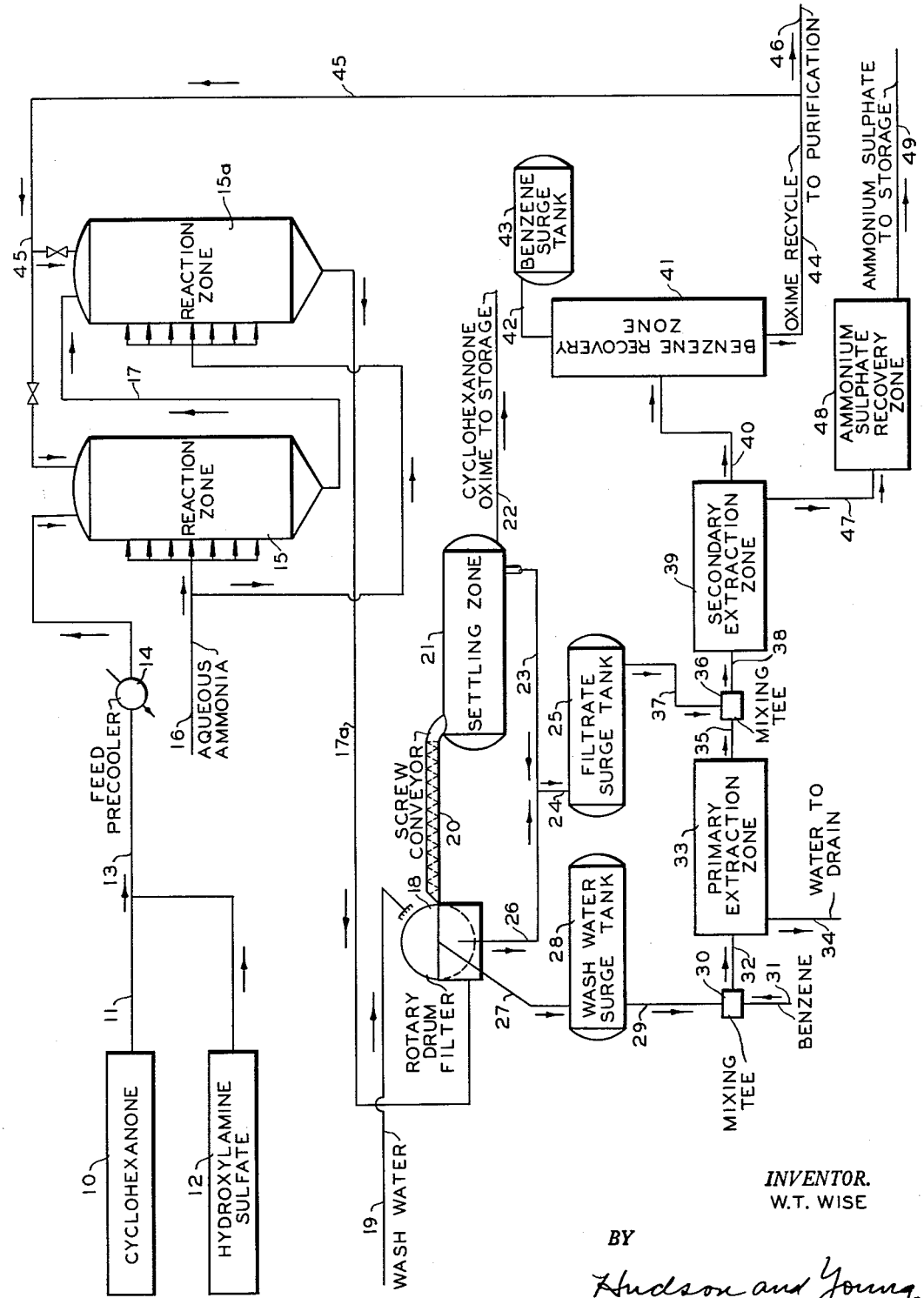

2,756,258

PRODUCTION OF CYCLOHEXANONE OXIME

William T. Wise, Bartlesville, Okla., assignor to Phillips Petroleum Company, a corporation of Delaware Application August 14, 1953, Serial No. 374,203

8 Claims. (Cl. 260—566)

This invention relates to the production of oximes. In one aspect this invention relates to the production of oximes by the reaction of aqueous hydroxylamine salts with a carbonyl compound in the presence of a neutralizing agent. In another aspect this invention relates to recovering oxime product and unreacted organic chemicals from the aqueous phase of a reaction mixture. In another aspect this invention relates to treating the aqueous phase of a reaction mixture. In still another aspect this invention relates to extracting with a solvent the aqueous phase of a reaction mixture. In still another aspect this invention relates to extracting with benzene the aqueous phase of a reaction mixture. In still another aspect this invention relates to recovering oxime product and unreacted organic chemicals by extracting with benzene the aqueous phase of a reaction mixture. In still another aspect this invention relates to increasing the yield of oxime. In still another aspect this invention relates to recycling recovered organic chemicals to a reaction mixture so that an increased yield of oxime results. In still another aspect this invention relates to increasing the yield of oxime by extracting with benzene an aqueous phase of a reaction mixture and recycling organic chemicals thus recovered to said reaction mixture. In still another aspect this invention relates to recovering and recycling, together, unreacted reagent and product, to a reaction zone.

Oximes are well-known organic chemicals which have long been used in the identification and purification of other organic chemicals. In recent years oximes have been used as intermediates in the preparation of lactams. A well-known example is the preparation of caprolactam from cyclohexanone oxime by the Beckmann rearrangement in the presence of such agents as concentrated sulfuric acid. Various methods have been proposed for the preparation of oximes. It is well-known that oximes can be prepared by reacting an aqueous hydroxylamine salt with a carbonyl compound in the presence of a neutralizing agent. For example, cyclohexanone oxime can be prepared by reacting an aqueous solution of hydroxylamine sulphate with cyclohexanone in the presence of aqueous ammonia.

Certain difficulties are encountered in these reactions. The oxime forms as a precipitate and, therefore, the reactions generally go well toward completion. However, in most instances there remains an appreciable amount of unreacted chemicals. It is, of course, desirable to recover these expensive chemicals if possible. Another difficulty is encountered in the separation and purification of the oxime precipitate. Generally the precipitate is filtered and washed with water to remove occluded impurities, which comprise unreacted organic chemicals such as cyclohexanone and various inorganic chemicals including ammonium sulphate. Frequently, the solubility of the oxime in water is not negligible. Thus, losses of oxime product to the wash water occur.

I have found that these difficulties can be overcome and appreciable increases in oxime yield effected by extracting the filtrate and the filter cake wash water from the filtering operation with benzene. The material extracted by the benzene from the filtrate is comprised mainly of unreacted reagent, such as cyclohexanone, together with some oxime, such as cyclohexanone oxime. The amount of oxime contained in the filtrate will, of course, depend upon the solubility of the oxime in the aqueous reaction mixture. The material extracted from the water used to wash the filter cake is comprised of unreacted reagent occluded on the oxime and also oxime which the wash water dissolves. By so extracting said filtrate and said filter cake wash water appreciable quantities of valuable chemicals, both reagent and product, are recovered.

I have further found that not only can the recovered reagent, such as cyclohexanone, be recycled directly to the reaction zone but also that the recovered product, such as cyclohexanone oxime, can be recycled to the said reaction zone without any intermediate, additional purification steps.

I have found that said product "rides through" said reaction zone without affecting the color, melting point or other properties thereof, or without any harmful effect on the reaction itself. My invention not only makes possible increased yields of oximes but also makes it possible to recover and recycle, together, both unreacted reagent and product, to the reaction zone.

Thus, according to the invention, there is provided a process for the production of oximes in a reaction zone wherein a carbonyl compound is reacted with an aqueous hydroxylamine salt in the presence of a neutralizing agent which comprises; filtering the resulting reacted mass and extracting with benzene the several aqueous streams, resulting from said filtering step, to recover organic chemicals dissolved therein and returning said recovered organic chemicals without any intermediate, additional purification steps directly to said reaction zone.

In respect of said extraction step solvents alternative to benzene which may be employed are toluene, xylenes, benzene derivatives, etc. Any liquid having a high solvent power for the unreacted organic chemical and the oxime can be employed as the solvent. The liquid should be easily separable from both the unreacted organic chemical and the oxime. The liquid should be substantially immiscible with water and should be stable when subjected to distillation. For economic reasons the liquid should be low in cost and readily available. Benzene possesses all these characteristics and is, therefore, my preferred solvent.

The attached drawing portrays diagrammatically one embodiment of the invention and a typical arrangement of apparatus for carrying out the invention.

Referring now to the drawing. Cyclohexanone from storage tank 10 is passed through line 11 and mixed with hydroxylamine sulfate solution from storage tank 12 in line 13. The admixture is passed through feed precooler 14 into reaction zone 15. Aqueous ammonia from line 16 is injected multipointwise into said reaction zone. Reaction mixture is withdrawn through line 17 to reaction zone 15a, where additional aqueous ammonia from line 16 is injected multipointwise, as shown. Reaction product from zone 15a is withdrawn via line 17a and passed to rotary drum filter 18 wherein cyclohexanone oxime product is filtered out, washed with water introduced through line 19 and then conveyed by means of screw conveyor 20 into settling zone 21 equipped with suitable heating means (not shown). Molten cyclohexanone oxime is passed to storage through line 22. Water from said settling zone is passed through lines 23 and 24 into filtrate surge tank 25. Filtrate from said filter is passed through lines 26 and 24 into tank 25. Wash water from said filter is passed through line 27 into wash water surge tank 28. Wash water from said surge tank 28 is passed through line 29 to mixing T 30 where it is mixed with benzene from line 31 (said benzene can come from storage or from benzene surge tank 43 through a line not shown) and the mixture passed through line 32 into primary extraction zone 33 wherein a phase separation is effected and waste water is withdrawn through line 34. The benzene phase, containing dissolved cyclohexanone oxime, is passed through line 35 into mixing T 36 where it is mixed with filtrate, containing dissolved unreacted cyclohexanone and dissolved inorganic chemicals, passed from filtrate surge tank 25 via line 37. The admixture is passed through line 38 into secondary extraction zone 39 wherein a phase separation is effected. The benzene phase, containing dissolved cyclohexanone oxime and dissolved unreacted cyclohexanone, is passed through line 40 into benzene recovery zone 41 wherein said phase is distilled to recover benzene which is removed through line 42 to benzene surge tank 43. Recovered unreacted cyclohexanone and cyclohexanone oxime are withdrawn through line 44 and recycled through line 45 to reaction zone 15 and/or to reaction zone 15a. A portion of said recycle stream is withdrawn from the system as required through line 46 to a purification zone (not shown) for the removal of impurities which could otherwise pyramid to an undesired level. The water phase from secondary extraction zone 39 is passed through line 47 into recovery zone 48 wherein ammonium sulphate is recovered and passed to storage through line 49.

While the extraction of the water streams with benzene in primary and secondary extraction zones has been described as being carried out employing mixing T's and settling zones, it is obvious that other forms of apparatus can be used. For example, the stream to be extracted and the benzene can be mixed in a centrifugal pump and then passed to a settling zone. Or, if desired, the extraction can be carried out countercurrently in a vertical column as is commonly done in other extraction processes. Said vertical column can be equipped with suitable conventional means for securing intimate contact such as bubble trays, baffles, jack chain, rings, etc. The actual choice of equipment will depend to a large extent upon operating conditions occasioned by the solvent employed and the particular oxime being produced.

The extraction is carried out in a liquid-liquid manner, i. e., under conditions such that two separate liquid phases are present. When benzene is employed as the solvent the temperature of the primary extraction zone is normally maintained at a temperature ranging from about 90° to about 130° F., preferably from about 100° to 120° F., and still more preferably from about 105° to 115° F. The temperature of the secondary extraction zone is normally maintained at a temperature ranging from about 100° to about 150° F., preferably from about 110° to about 130° F., and more preferably from about 115° to about 125° F., when benzene is employed as the solvent. As will be readily understood by those skilled in the art, these temperatures can be varied depending upon the solvent employed, material being extracted, solvent to water ratios, etc.

The pressure at which the extraction is carried out is ordinarily substantially atmospheric. The pressure should be sufficient to hold the materials present substantially entirely in liquid condition. In case a normally gaseous solvent is employed a pressure sufficient to maintain such solvent in substantially liquid condition is maintained.

The amount of solvent employed should be sufficient to extract substantially all of the unreacted organic chemical, such as cyclohexanone, and all of the dissolved oxime, such as cyclohexanone oxime, contained in the water streams to be extracted. It will be obvious to those skilled in the art that in many cases considerations of equilibrium and imperfect contact will prevent absolutely complete removal of the dissolved organic chemicals from the water phase being extracted, the known laws of distribution applying.

In the interest of economy the amount of solvent fed to the extraction step is preferably kept near the minimum required to extract the organic chemicals from the water phase being extracted.

While the extraction step has been described as comprised of a primary and secondary zone, said zones can be combined if desired and both the wash water stream and the filtrate stream extracted in one zone. However, I prefer to employ two zones as shown and described. I have found such practice to be more efficient. If desired, or necessary, additional solvent can be added to the stream being passed from the primary extraction zone to the secondary extraction zone. Likewise, it is within the scope of the invention to extract said streams in separate zones, combine the extract phases thus obtained, and recover dissolved organic chemicals from said combined extract phases.

Operating conditions within the solvent recovery zone will depend upon the solvent employed and the materials dissolved in said solvent. As will be understood by those skilled in the art temperatures sufficient to distill the solvent from the recovered chemicals dissolved therein will be employed. Likewise, a temperature sufficient to maintain the recovered chemicals in a liquid phase in the bottom of a distillation tower will be employed. Said recovered chemicals are maintained in liquid phase during recycle through lines 44 and 45 to reaction zone 15.

While the extraction step, solvent recovery and recycle of recovered chemicals can be carried out intermittently in a batchwise manner, I prefer to employ continuous operation.

The following examples illustrate some of the advantages when operating according to my invention.

*Example I*

100 pounds per hour of cyclohexanone of 95 per cent purity are mixed with 137 pounds of hydroxylamine sulphate per hour in the form of an aqueous solution containing 5.9 pounds of hydroxylamine sulphate per gallon. Said mixture is passed through a precooler and passed into a water cooled reactor equipped with stirring means. Simultaneously with the introduction of said chemicals, there is introduced multipointwise 29.2 gallons per hour of aqueous ammonia containing 1.2 pounds of ammonia per gallon. For optimum results the temperature within said reactor should be maintained between about 110° F., and about 130° F. Said reactor is preferably of such size as to give a flow rate therethrough of approximately 0.35 gallon per hour per gallon of reactor volume. The resulting reacted mass is withdrawn from said reactor and introduced into a rotary drum filter wherein cyclohexanone oxime product is filtered out, washed with water, and conveyed to a heated settling tank maintained at a temperature sufficient to cause said oxime to be in a liquid phase and permit occluded water to separate therefrom. The rate of production of cyclohexanone oxime is 98 pounds per hour.

*Example II*

To the process of Example I and using the same initial quantities of chemicals, operating conditions, etc., the following steps are added. The filter cake wash water is extracted at a temperature of about 110° F., with 0.4 volume of benzene per volume of wash water per hour to obtain a first extract phase and a first water phase which is discarded. One volume of said first extract phase is then used to extract 0.2 volume per hour of combined filtrate stream from the filtering operation and water stream from said settling tank to obtain a second extract phase and a second water phase. Said second extract phase is then distilled to recover 2.7 pounds per hour of cyclohexanone and 10.4 pounds per hour of cyclohexanone oxime which are returned to said reactor to give an ultimate yield of 110 pounds per hour of cyclohexanone oxime.

Reasonable variation and modification are possible within the scope of the foregoing disclosure, the drawing and the appended claims to the invention, the essence of which is that a process for the production of oximes has been provided wherein the several aqueous streams resulting from a filtering operation in said process are extracted with benzene to recover organic chemicals dissolved in said streams and said recovered chemicals are returned, together, without any additional purification steps, to the original reaction zone.

I claim:

1. In a continuous process for the production of cyclohexanone oxime wherein cyclohexanone is reacted with an aqueous solution of hydroxylamine sulfate in the presence of a neutralizing agent in a reaction zone, the steps of: filtering the resulting reacted mass to obtain a solid phase and an aqueous phase; extracting said aqueous phase with benzene to remove dissolved cyclohexanone and dissolved cyclohexanone oxime therefrom in an extract phase; passing said extract phase to a distillation zone; removing said benzene as an overhead product from said distillation zone; removing said dissolved cyclohexanone and said dissolved cyclohexanone oxime as a bottoms product from said distillation zone; and returning said bottoms product of cyclohexanone and cyclohexanone oxime, without further purification, to said reaction zone.

2. In a continuous process for the production of cyclohexanone oxime wherein cyclohexanone is reacted with an aqueous solution of hydroxylamine sulfate in the presence of a neutralizing agent in a reaction zone, the steps of: filtering the resulting reacted mass to obtain a filter cake and a filtrate; washing said filter cake with water to obtain a wash water; extracting said wash water with benzene to obtain an extract phase having dissolved cyclohexanone and dissolved cyclohexanone oxime therein; extracting said filtrate with benzene to obtain an extract phase having dissolved cyclohexanone and dissolved cyclohexanone oxime therein; combining said extract phases and passing same to a distillation zone; removing benzene as an overhead product from said distillation zone; removing said dissolved cyclohexanone and said dissolved cyclohexanone oxime as a bottoms product from said distillation zone; and returning said bottoms product of cyclohexanone and cyclohexanone oxime, without further purification, to said reaction zone.

3. In a continuous process for the production of cyclohexanone oxime wherein cyclohexanone is reacted with an aqueous solution of hydroxylamine sulfate in the presence of a neutralizing agent in a reaction zone, the steps of: washing said filter cake with water to obtain a wash water; filtering the resulting reacted mass to obtain a filter cake and a filtrate; extracting said wash water with benzene to obtain a first extract phase having cyclohexanone and cyclohexanone oxime dissolved therein; extracting said filtrate with said first extract phase to obtain a second extract phase having cyclohexanone and cyclohexanone oxime dissolved therein; passing said second extract phase to a distillation zone; distilling said second extract phase to recover said benzene as an overhead product from said distillation zone; removing said dissolved cyclohexanone and said dissolved cyclohexanone oxime as a bottoms product from said distillation zone; and returning said bottoms product of cyclohexanone and cyclohexanone oxime, without further purification, to said reaction zone.

4. In a continuous process for the production of cyclohexanone oxime wherein cyclohexanone is reacted with an aqueous solution of hydroxylamine sulfate in the presence of a neutralizing agent in a reaction zone, the steps of: filtering the resulting reacted mass to obtain a filter cake and a filtrate; washing said filter cake with water to obtain a wash water; combining said filtrate and said wash water to form a combined stream; extracting said combined stream with benzene to remove dissolved cyclohexanone and dissolved cyclohexanone oxime therefrom in an extract phase; distilling said extract phase in a distillation zone to recover said benzene as an overhead product, and said dissolved cyclohexanone and said dissolved cyclohexanone oxime as a bottoms product; and returning said bottoms product of cyclohexanone and cyclohexanone oxime, without further purification, to said reaction zone.

5. In a continuous process for the production of cyclohexanone oxime wherein cyclohexanone is reacted with an aqueous solution of hydroxylamine sulfate in the presence of a neutralizing agent in a reaction zone, the steps of: filtering the resulting reacted mass to obtain a filter cake and a filtrate; washing said filter cake with water to obtain a wash water; extracting said wash water with benzene to remove dissolved cyclohexanone and dissolved cyclohexanone oxime therefrom in a first extract phase; extracting said filtrate with benzene to remove dissolved cyclohexanone and dissolved cyclohexanone oxime therefrom in a second extract phase; distilling each of said first and said second extract phases in separate distillation zones to remove said benzene as an overhead product; removing said dissolved cyclohexanone and said dissolved cyclohexanone oxime as bottoms product streams from said separate distillation zones; and returning said bottoms product streams, without further purification, to said reaction zone.

6. A process according to claim 7 wherein said solvent is selected from the group consisting of benzene, toluene and xylene.

7. In a process for the production of an oxime wherein cyclohexanone is reacted with an aqueous solution of hydroxylamine sulfate in the presence of sufficient aqueous ammonia to neutralize the acid liberated by said reaction, the resulting reaction mass is filtered to obtain a filter cake and a filtrate, and said filter cake is washed with water to obtain a wash water, the improvement which comprises: extracting said wash water and said filtrate with a solvent, which is immiscible with water and which has a high solvent power for cyclohexanone and cyclohexanone oxime, to form an extract phase and an aqueous phase; passing said extract phase to a distillation zone; removing said solvent from said distillation zone as an overhead product; removing dissolved cyclohexanone and dissolved cyclohexanone oxime from said distillation zone as a bottoms product; and recycling said bottoms product of cyclohexanone and cyclohexanone oxime to said reaction zone without further purification.

8. A process according to claim 3 wherein said extraction of said wash water is carried out at a temperature within the range of 90 to 130° F. and said extraction of said filtrate is carried out at a temperature within the range of 100 to 150° F.

References Cited in the file of this patent

UNITED STATES PATENTS

| 2,237,365 | Schlack | Apr. 8, 1941 |
| 2,283,150 | Schlack | May 2, 1942 |
| 2,696,505 | Welz | Dec. 7, 1954 |

FOREIGN PATENTS

| 237,391 | Switzerland | Aug. 1, 1945 |